Patented Nov. 1, 1949

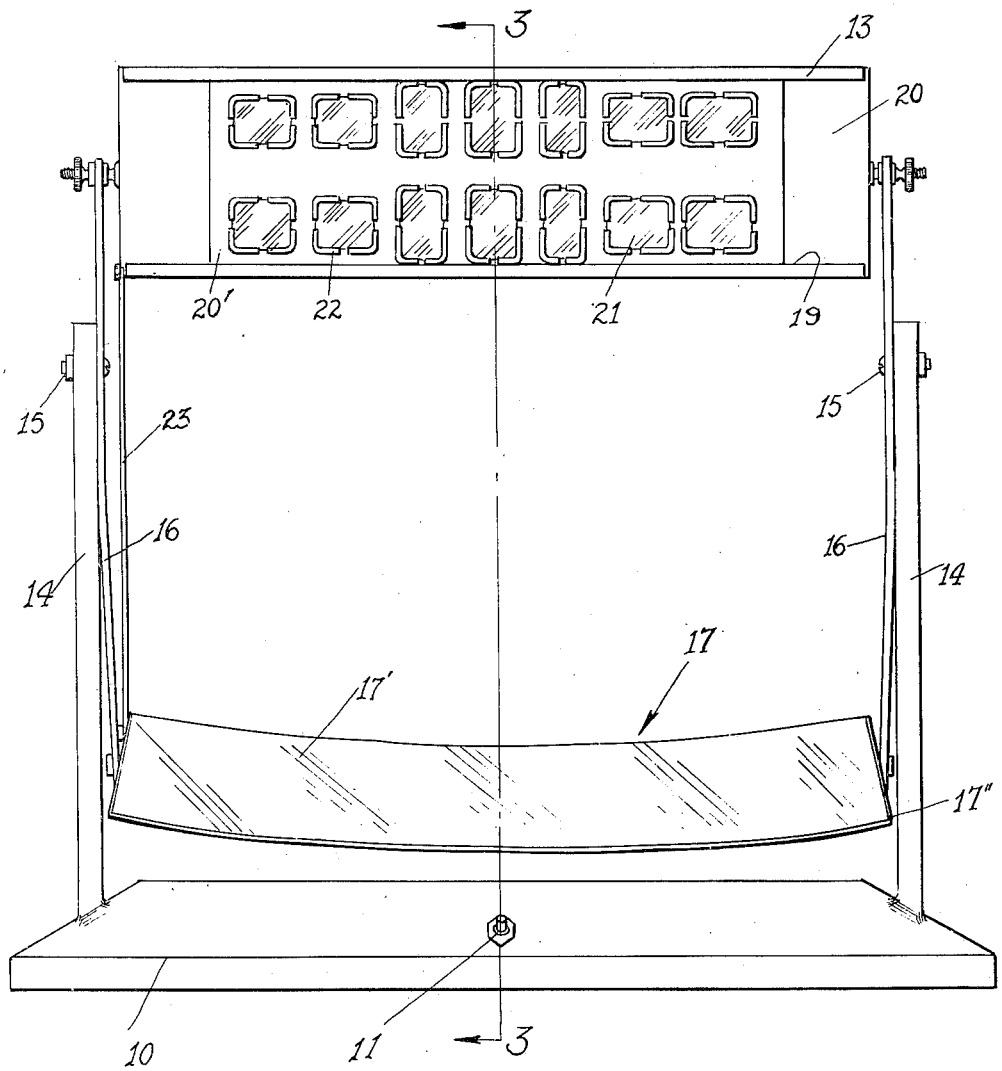

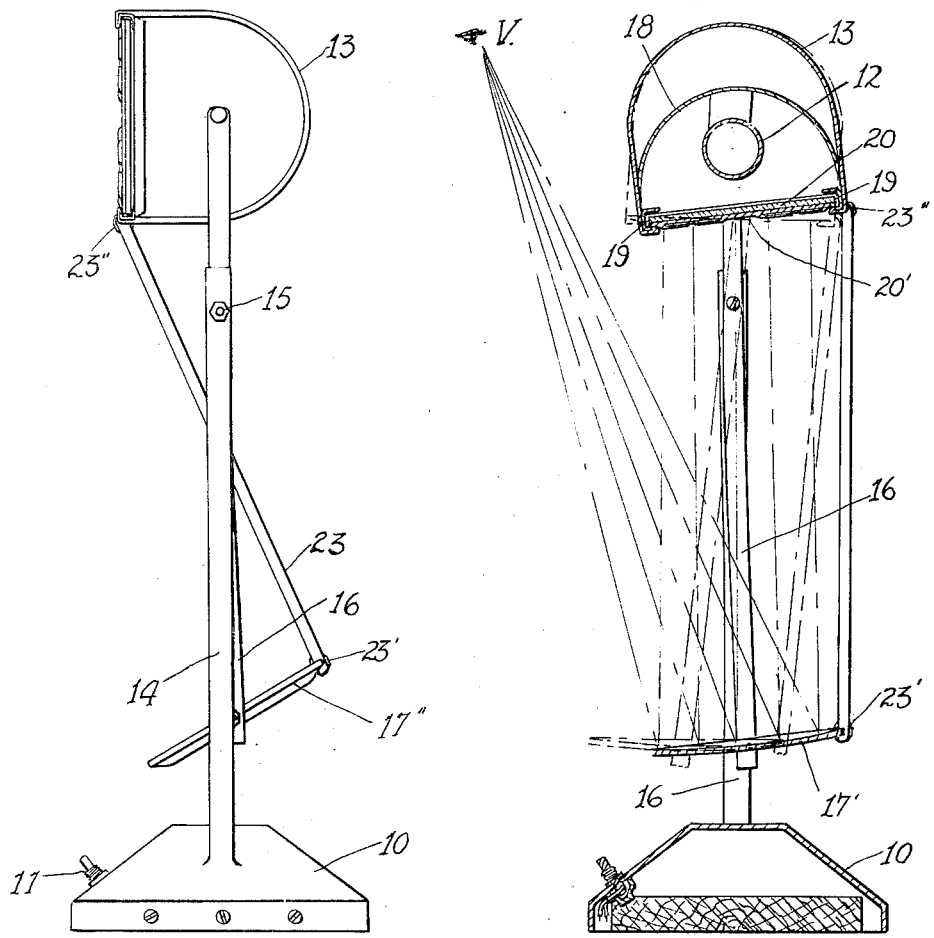

2,486,914

UNITED STATES PATENT OFFICE 2,486,914

FILM VIEWING DEVICE HAVING PIVOTALLY CONNECTED LAMP HOUSING AND REFLECTOR

Leonard M. Bolin, Chicago, Ill., assignor to Rota-Seat, Inc., Cicero, Ill., a corporation of Illinois Application July 28, 1945, Serial No. 607,548

10 Claims. (Cl. 88—74)

This invention relates to improvements in a film viewing device, in particular a viewing device of the type employed by dentists and like practitioners for inspecting X-ray film, or cards mounting a plurality of X-ray films such as are commonly employed in the dental profession.

Under the present practice, a practitioner desiring to study a film holding card of the type referred to above customarily positions the same on a fixed light box presenting a rearwardly illuminated ground glass screen and views the film by light transmitted therethrough. In the event magnification is desired, a magnifying glass is employed. However, in obtaining desired magnification of size, considerable clarity, detail or definition is lost. At the same time, a great deal of directly transmitted glare tends to produce eye strain if the examination or examinations are made over a protracted period. Moreover, under this system the viewer necessarily tends to concentrate all of his attention on a single film in the case of a dental X-ray study, or on a localized area of a larger film, thereby minimizing his opportunity to conveniently study and correlate various symptoms exposed by other films or portions of the larger film.

By the present invention I provide a device which, while enabling direct viewing, magnified or not at the user's option, also enables viewing of the object, film or card by reflected light in a desirable size magnification, while maintaining clarity of detail and definition. The device thereby enables coordinate studies of an object to be made, directly when high magnification is desired, along with a check by reflected viewing with some magnification and full retention of detail.

It is an object of the invention to provide a device of the general type referred to including a light source for the viewing of the films by transmitted light and a magnifying reflector, with an interconnecting linkage enabling the convenient positioning and viewing of an image of the films.

A further object is to provide a very simplified device of the type described involving an articulated reflector and lamp housing whereby viewing of the films by direct transmitted light or by reflected light is made possible.

A still further object is to provide a film viewing device employing a lamp housing emanating an intense degree of illumination and an improved reflector operatively linked to said housing for automatic positioning and focussing in accordance with positioning of the housing, wherein the reflector is of a type to insure optimum accuracy of the image reflected with reference to the film through which light is transmitted and a viewing point to one side of said housing.

The foregoing statements are indicative in a general way of the nature of the invention, but other and more specific objects will be apparent to those skilled in the art upon a full understanding of the construction and operation of the device.

One embodiment of the invention is presented herein for the purpose of exemplification, but it will be appreciated that the invention is susceptible of incorporation in other modified forms coming equally within the scope of the appended claims.

In the drawings,

Fig. 1 is a view in front elevation of the film viewing device of this invention, illustrating the same in a position for direct viewing of a film mounting sheet, without employing the reflector associated with the device;

Fig. 2 is a view in side elevation, looking from the right of Fig. 1, further illustrating structural details of the device; and Fig. 3 is a view in section on a line corresponding to line 3—3 of Fig. 1, illustrating, in solid and dotted lines respectively, the lamp housing and articulated reflector in two selective positions for indirect viewing of the film card.

This invention provides a film viewing device including a lamp housing and a reflecting device articulated to the lamp housing in such manner as to reflect to the viewer, in a convenient and comfortable position of that person, a faithfully accurate image of the films through which light is transmitted from the housing.

Referring to the drawings, the reference numeral 10 designates the hollow base of the device which is provided with a finger switch 11 controlling the transmission of current to a fluorescent illumination tube 12 in the elevated lamp housing 13 of the device. Details of the switch wiring and other electrical connections to a source of power have been omitted inasmuch as they are entirely conventional and well understood by those skilled in the art. However, the wiring is concealed in base 10 and may be brought to the tube 12 through one of the housing supporting uprights, to be described. The fluorescent tube 12 is practically coextensive in length with the housing 13 and is disposed in a conventional manner in bayonet type contact slots (not shown) in the opposite ends of the housing.

The base 10 is provided with a pair of upright standards 14 at either end thereof, which are preferably of hollow tubular section to accommodate wiring leads. These uprights afford pivots 15 for a mounting device in the form of a pair of supporting and spacing arms 16, the latter being in turn pivoted at their upper ends to central points on the sides of lamp housing 13 and at their lower ends to the sides of a reflector assembly 17 medially of said sides.

The reflector 17' has a parabolic section in both its longitudinal and transverse dimensions, as illustrated respectively in Figs. 1 and 3, for a relatively undistorted reflection of images impinging the same from the lamp housing. This reflector is carried in a dished support 17" to which links 16 are pivoted.

Lamp housing 13 is provided with an arcuate polished lamp reflector 18 internally thereof and with a pair of lateral guide ways 19 adjacent its lower edges, which guide ways receive a ground glass screen 20. Appropriate provision may be made to secure this ground glass in place against undesired or accidental longitudinal movement, but permitting removal for access to the housing to remove or replace tube 12. The ways 19 also provide means for the removable reception of a film mounting card 20' of well known type on which individual X-rays 21 are disposed in cut-out frames 22. The construction and use of such cards is well known in the art, and hence will not be further elaborated on.

An important feature of the invention is the articulation of the reflector assembly 17 and the lamp housing 13 for angular positioning of the one by shifting of the other. In the illustrated embodiment this means takes the form of a separate control rod 23 pivotally connected at its lower end 23' to the rear side of reflector assembly 17 and at its upper end 23" to the corresponding side of housing 13 (see Fig. 3). The length of rod 23 is so chosen as to enable swinging of the lamp housing from position for reflected viewing of the film, as in Fig. 3, to the position illustrated in Figs. 1 and 2, so as to facilitate insertion of sheet 20 in proper position and, in some cases, to enable direct viewing of said sheet at the level of the housing. Any desired degree of magnification during such direct viewing may be obtained with the assistance of a glass of desired strength. Manipulation of the lamp housing in counterclockwise direction from the position illustrated in Fig. 2 to the position illustrated in Fig. 3 will, through the agency of rod 23, swing the reflector 17 into a position to reflect the film images upwardly at any angle desired by the user whose point of vision is located above and forwardly of the lamp housing. The parabolic character of the reflector 17' in both dimensions thereof insures against loss of clarity and detail by its condensing effect. Moreover, experience has shown that much of the eye fatigue attributable to glare in direct viewing is eliminated by the reflected viewing provided by the invention. The preservation of clarity of definition is probably also responsible for the fact that the user finds no difficulty in viewing the film or card as a unit in the reflector, rather than the necessity or tendency to view only a single film area which exists in the case of direct viewing. The reflector 17' may be designed to afford any desired degree of magnification. In a practical embodiment a power of 1.16 X has been found to be desirable for the device shown, with reference to factors such as distance between the light housing and mirror section of the latter, etc. Slight variations in the angularity of the reflector assembly 17 to accommodate the position of the user's eyes are effected by tilting the housing 13 in the appropriate direction, as illustrated in solid and dotted lines in Fig. 3, without introducing objectionable foreshortening. The reflector and card 20' maintain parallel relation and swing in identical angular directions when being positioned for reflected viewing, as in Fig. 3.

In addition to automatic pivoting of the reflector assembly 17 about the axis of its rod pivots 23', in response to swinging of housing 13 about the axis of its rod pivots 23", the housing and reflector are swingable as a unit with connecting links 16 about the axis of the pivots 15 of the links. This is a still further convenience which enables the reflector 17 to be projected forwardly of the uprights 14 to any degree desired or necessary for the viewing of the reflected image, i. e., from the solid line to the dotted line position of Fig. 3.

I am aware that various devices have heretofore been evolved for the viewing of films; however, to my knowledge no one has previously made available a device for direct or reflected viewing wherein the viewing angle is adjusted automatically through a linkage pivotally interconnecting the light source and object carried thereon with the reflector in a convenient manner. The present device makes this possible; furthermore the improved parabolic magnifying reflector assures perfectly faithful reproduction of the films.

In Fig. 3 I have attempted to illustrate conventionally the manner of employing the device whereby these objectives are obtained, the viewing point being designated V; and it is believed that those skilled in the art will appreciate the utility and advantages of the herein described automatically focussing viewing device. Direct and reflected viewing are made possible, with the advantage of the countercheck of results which they afford. The parabolic magnifying reflector minimizes distortion or foreshortening in the range of positions of the reflector for reflected viewing, and any foreshortening which does occur is in such negligible degree as to be imperceptible by the viewer.

The interconnection of the reflector with the fixedly associated lamp housing and object to be viewed insures parallelism of the image and card 20' throughout a relatively large range of viewing by reflected light, as illustrated in Fig. 3, this feature coacting with the parabolic characteristic of the reflector in eliminating possibility of distortion by foreshortening or elongation. Fixed positioning of the object and reflector in the manufacture of the device further insures optimum focussing and magnification of the image on the reflector.

I claim:

1. A film viewing device comprising a lamp housing, a reflector in spaced relation to and facing said housing, supporting means for said housing and reflector comprising a mounting device and means including spaced pivots mounting said housing and reflector in substantially parallel relationship on said mounting device, said supporting means enabling angular positioning of said reflector for impingement by and operative reflection of light emanating from said housing, means in fixed relation to said housing for supporting a light transmitting film to be viewed between said reflector and housing, and means operatively connected to said housing and reflector to interconnect the same for simultaneous pivotal movement on said pivots and automatic angular positioning of the reflector in selected parallel reflecting relations to the housing.

2. A film viewing device comprising a lamp housing, a reflector in spaced relation to and facing said housing, supporting means for said housing and reflector comprising a mounting device and means including spaced pivots mounting said housing and reflector in substantially parallel relationship on said mounting device, said supporting means enabling angular positioning of said reflector for impingement by and operative reflection of light emanating from said housing, means in fixed relation to said housing for supporting a light transmitting film to be viewed between said reflector and housing, means operatively connected to said housing and reflector to interconnect the same for simultaneous pivotal movement on said pivots and automatic angular positioning of the reflector in selected parallel reflecting relations to the housing, a base and means pivoting said supporting means to said base between said respective housing and reflector pivots for further swinging movement of the housing and reflector as a unit.

3. A film viewing device comprising a lamp housing having a source of illumination therein, a reflector in spaced relation to and facing said housing, a base, means for adjustably positioning said reflector and lamp housing in substantially parallel relationship on said base for impingement of said reflector by light emanating from said housing in an operative position of the latter, and for operative reflection of said light, supporting means in fixed relation to said reflector for supporting a light transmitting film to be viewed between said reflector and housing, and means operatively connected to said housing and reflector to interconnect the same for simultaneous adjusting movement in selected parallel reflecting relations thereof.

4. A film viewing device comprising a lamp housing having a source of illumination therein, a reflector in spaced relation to and facing said housing, a base, means including individual reflector and housing pivots for adjustably mounting said reflector and housing in substantially parallel relationship on said base for impingement of the reflector by light emanating from said housing in an operative position of the latter, and for operative reflection of said light, supporting means in fixed relation to said reflector for supporting a light transmitting film to be viewed between said reflector and housing, and means operatively connected to said housing and reflector to interconnect the same for automatic simultaneous adjusting movement about their respective pivots, said reflector and housing mounting means including means adapting said housing and reflector for further movement as a unit on said base.

5. In a viewing device, a base, a light source, a reflector spaced from said base and facing said source, a support for said reflector and light source, individual pivots adjustably mounting said reflector and light source in substantially parallel relationship on said support, means pivotally connecting said support to said base between said source and reflector, means in fixed relation to said source for supporting an object to be viewed by light transmitted from said source through said object and reflected from said reflector, and means eccentrically connected to said reflector and source to articulate the same for correlated pivotal movement about their respective pivots on said support.

6. In a viewing device, a light source, a reflector spaced therefrom and facing said source, means including individual pivots on which said source and reflector are mounted to support and adjustably position said reflector and light source in substantially parallel relationship for impingement of the reflector by light emanating from said source in an operative position of the latter, and for operative reflection of said light, means operatively connecting said reflector with said source and automatically adjusting one thereof about its pivot upon movement of the other about its pivot, and means to support an object to be viewed in fixed relation to said source for viewing in said reflector of an image reflected by light transmitted through said object, said first named means including means to shift said source and object out of position for reflected viewing to enable direct viewing of the object by transmitted light.

7. A viewing device comprising a pivotal light emitting housing member, a pivotal reflector member facing said housing member, means for adjustably supporting said members including a base, individual pivots pivotally mounting said members in substantially parallel relationship on said base, and means operatively connected to said respective members and automatically actuating one thereof about its pivotal axis in response to movement of the other about its pivotal axis, and means in fixed relation to said housing member to support an object to be viewed between said members in several positions of adjustment thereof by light transmitted from the housing member through said object and reflected from the reflector member.

8. In a device for viewing film, a horizontally elongated supporting base, a pair of longitudinally spaced, substantially parallel upright members on said base, a horizontally elongated housing member adapted to have a light source mounted therein, means at the ends of said housing member pivotally mounting the same on said upright members adjacent the upper ends thereof for pivotal adjustment about a horizontal axis, means for supporting a film to be viewed in fixed relation to said housing member for passage through said film of light from said source, a horizontally elongated reflector member substantially parallel to and facing said housing member, means pivotally mounting said reflector member on said upright members adjacent the lower ends thereof for pivotal adjustment about a horizontal axis to reflect light passing through said film from said source in a pivotally adjusted position of said housing member, said mounting means for said reflector member including means for moving the latter in a generally horizontal direction relative to said housing member, and means operatively interconnecting said reflector and housing members for coordinate pivotal movement about the respective horizontal axes thereof.

9. A device for indirectly viewing X-ray films under magnification, comprising a horizontally elongated supporting base, a pair of longitudinally spaced, substantially parallel upright members on said base, a horizontally elongated, downwardly facing, light housing member containing a light source, means carried by the face of the housing member in opposition to the light source for removably supporting the film to be viewed, means at the ends of said housing member supported by said upright members for pivotally mounting the housing member on a horizontal axis located adjacent the upper ends of said upright members to permit tilting movement of the housing member about said axis, a horizontally elongated, upwardly facing, concave magnifying mirror arranged beneath the housing member in a position substantially parallel to and facing the latter, means at the ends of said mirror supported by said upright members for pivotally mounting the mirror on a horizontal axis located adjacent the lower ends of said upright members to permit tilting movement of the mirror about said last mentioned horizontal axis, whereby to reflect light passing from said source through said film, and means connecting the housing member and the mirror for causing tilting movement of the housing member about its axis to correspondingly tilt the mirror about its separate axis.

10. A device for indirectly viewing X-ray films under magnification, comprising a horizontally elongated supporting base, a pair of longitudinally spaced, substantially parallel upright members on said base, a horizontally elongated, downwardly facing, light housing member containing a light source, means carried by the face of the housing member in opposition to the light source for removably supporting the film to be viewed, means at the ends of said housing member supported by said upright members for pivotally mounting the housing member on a horizontal axis located adjacent the upper ends of said upright members to permit tilting movement of the housing member about said axis, a horizontally elongated, upwardly facing, concave magnifying mirror arranged beneath the housing member in a position substantially parallel to and facing the latter, means at the ends of said mirror supported by said upright members for pivotally mounting the mirror on a horizontal axis located adjacent the lower ends of said upright members to permit tilting movement of the mirror about said last mentioned horizontal axis, whereby to reflect light passing from said source through said film, and means connecting the housing member and the mirror for causing tilting movement of the housing member about its axis to correspondingly tilt the mirror about its separate axis, said light housing member being also tiltable from a downwardly facing position in reflecting relation to the mirror to a forwardly facing position to afford a direct view of the film.

LEONARD M. BOLIN.

REFERENCES CITED

The following references are of record in the file of this patent:

UNITED STATES PATENTS

| Number | Name | Date |
| --- | --- | --- |
| 76,253 | Scottron | Mar. 31, 1868 |
| 1,355,397 | Heylmun | Oct. 12, 1920 |
| 1,386,913 | Trabue | Aug. 9, 1921 |
| 1,393,432 | Dailey | Oct. 11, 1921 |
| 1,550,204 | Carleton | Aug. 18, 1925 |
| 1,629,974 | Russo | May 24, 1927 |
| 1,675,383 | Roccaforte | July 3, 1928 |
| 2,145,365 | Morelli | Jan. 31, 1939 |
| 2,211,218 | Serrurier | Aug. 13, 1940 |
| 2,211,376 | Isbell | Aug. 13, 1940 |
| 2,317,282 | Lopez-Henriquez | Apr. 20, 1943 |
| 2,363,427 | Langberg | Nov. 21, 1944 |